United States Patent
Emmerling et al.

(10) Patent No.: US 7,202,772 B2
(45) Date of Patent: Apr. 10, 2007

(54) ELECTRONIC ANTI-THEFT SYSTEM

(75) Inventors: Ulrich Emmerling, Kelheim (DE); Axel Müller, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 195 days.

(21) Appl. No.: 10/887,549

(22) Filed: Jul. 8, 2004

(65) Prior Publication Data

US 2005/0007243 A1    Jan. 13, 2005

(30) Foreign Application Priority Data

Jul. 8, 2003    (DE)    ................... 103 30 807
Nov. 28, 2003   (DE)    ................... 103 55 605

(51) Int. Cl.
G05B 19/00    (2006.01)
H04Q 5/22     (2006.01)

(52) U.S. Cl. .................... 340/5.72; 340/10.1
(58) Field of Classification Search ............ 340/5.7, 340/5.6, 61, 5.62, 64, 5.3, 31, 10.1, 10.5; 307/10.5, 10.1, 10.2; 701/1, 2
See application file for complete search history.

(56) References Cited

U.S. PATENT DOCUMENTS

| | | | |
|---|---|---|---|
| 5,744,875 A * | 4/1998 | Kleefeldt et al. | 307/10.2 |
| 6,259,168 B1 * | 7/2001 | Okada | 307/10.5 |
| 6,445,283 B1 * | 9/2002 | Pang et al. | 340/10.2 |
| 6,522,027 B1 | 2/2003 | Morillon et al. | 307/10.3 |
| 6,873,247 B2 * | 3/2005 | Ghabra et al. | 340/5.31 |
| 2002/0027500 A1 | 3/2002 | Reisinger | 340/426 |

FOREIGN PATENT DOCUMENTS

| | | |
|---|---|---|
| DE | 197 38 495 A1 | 3/1998 |
| DE | 197 56 341 A1 | 6/1999 |
| DE | 198 27 586 A1 | 12/1999 |
| DE | 199 24 081 A1 | 11/2000 |
| DE | 101 18 974 A1 | 11/2002 |
| DE | 100 64 141 C2 | 6/2003 |
| EP | 0984123 | 3/2000 |
| EP | 1186489 | 3/2002 |

* cited by examiner

*Primary Examiner*—Wendy R. Garber
*Assistant Examiner*—William Bangachon
(74) *Attorney, Agent, or Firm*—Baker Botts L.L.P.

(57) ABSTRACT

In a method for operating an electronic anti-theft system, data communication is effected between the control device and the key further to an access authorization request, whereby the control device unlocks the doors and deactivates an alarm system as a function of the data communication. The data communication for unlocking the doors and the data communication for disarming the alarm system are separate from each other. In this way, the mechanical unlocking of the doors can be initiated immediately after the data communication for unlocking the doors. The corresponding data communication for deactivating the alarm system is effected in parallel with this, whereby extensive cryptological data is exchanged between the control device and the key.

16 Claims, 2 Drawing Sheets

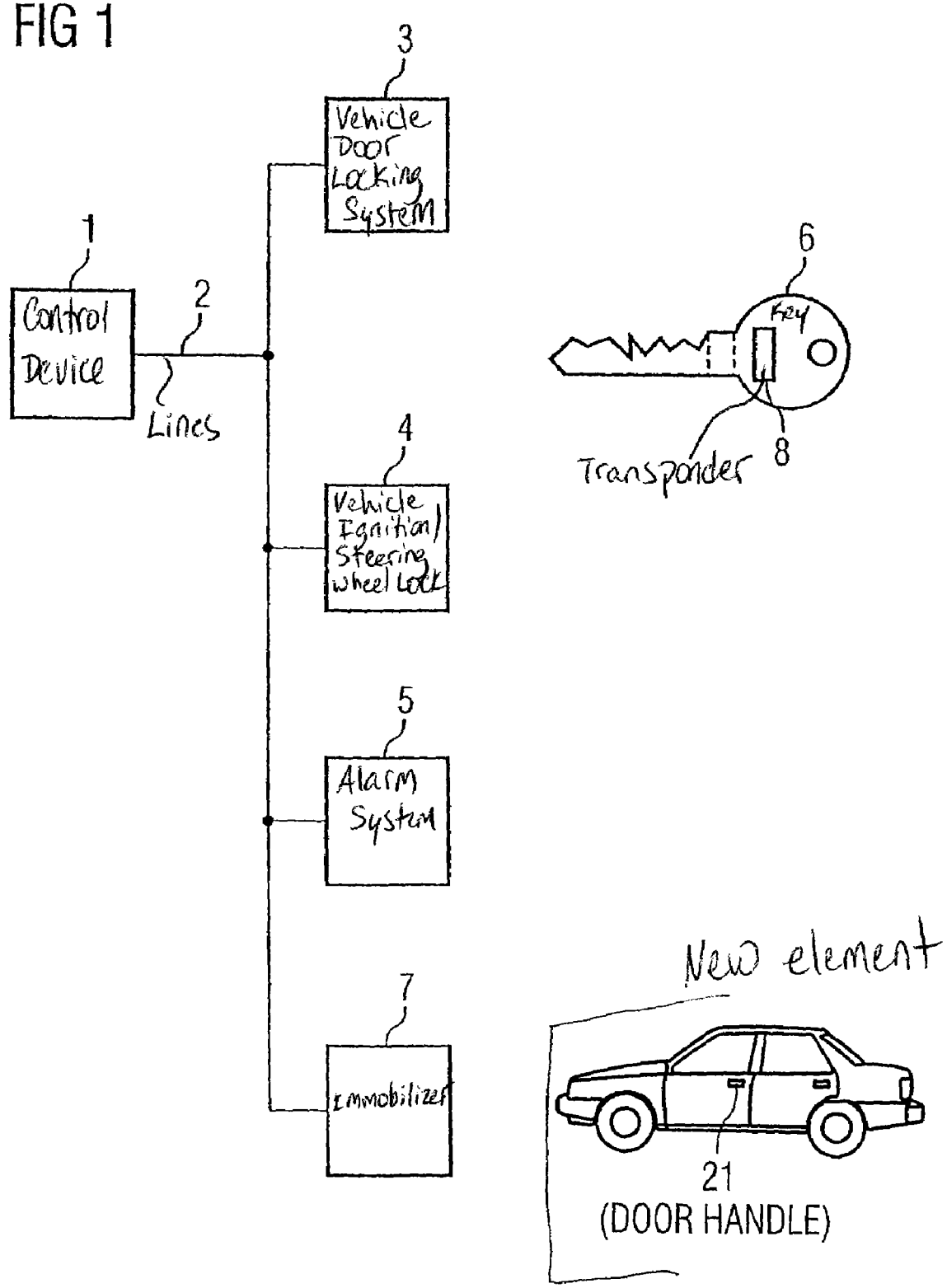

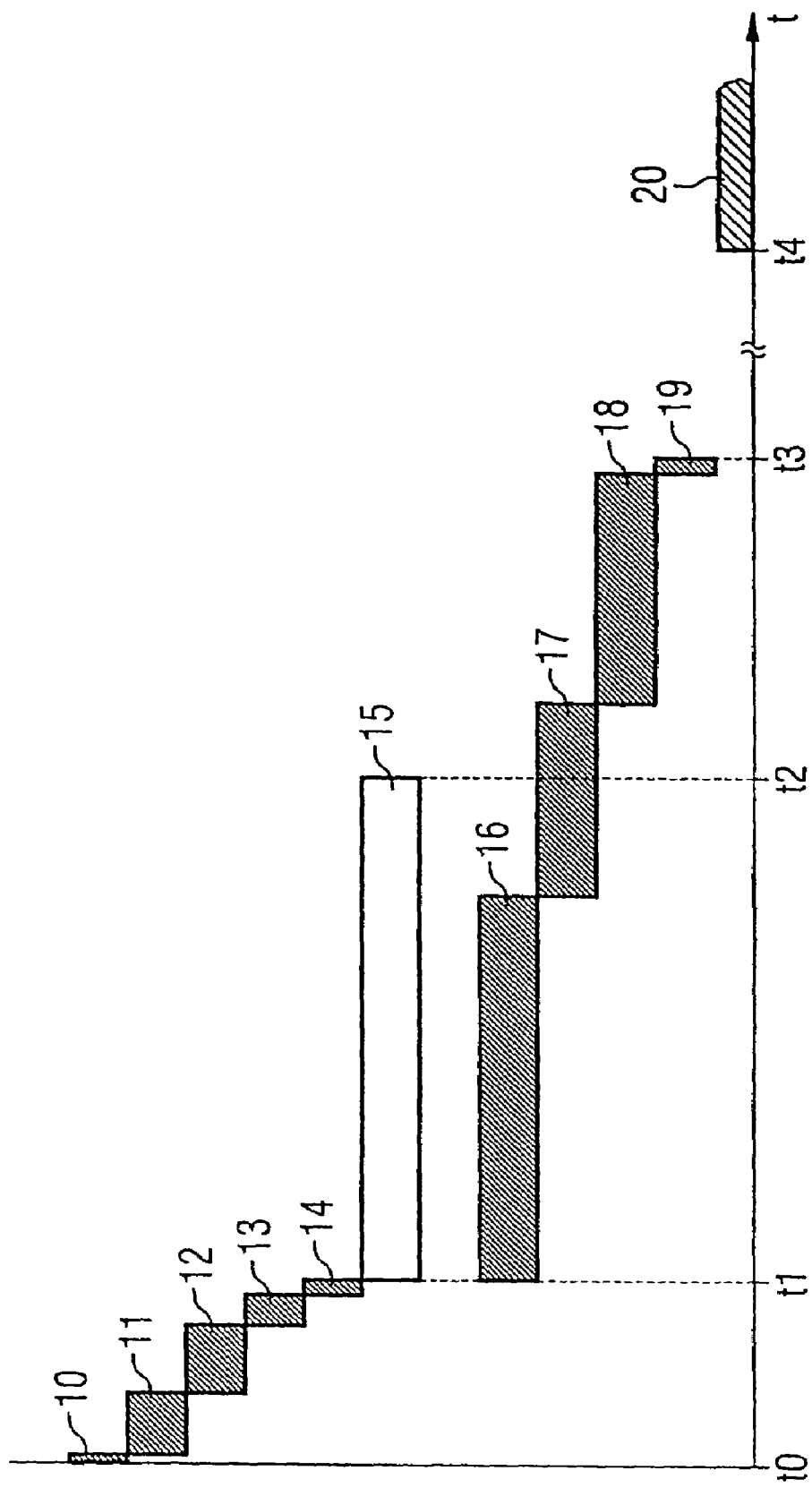

ELECTRONIC ANTI-THEFT SYSTEM

PRIORITY

This application claims priority to German Application No. 103 30 807.5 filed Jul. 8, 2003 and German Application No. 103 55 605.2 filed Nov. 28, 2003.

TECHNICAL FIELD OF THE INVENTION

The present invention relates to a method for operating an electronic anti-theft system, in particular for motor vehicles, as well as an electronic anti-theft system.

BACKGROUND OF THE INVENTION

Modern electronic anti-theft systems comprise an access authorization system, for example, a central locking system, a driver authorization system, for example with an immobilizer and an alarm system. These types of anti-theft systems are disclosed in German Patents DE 199 24 081 A1 and DE 197 56 341 A1.

A modern access authorization system for a motor vehicle comprises an electronic lock in a locking system, which communicates with the electronic key with which it is associated. This lock typically communicates with a control device associated with it, for example the control device of the engine controller, an immobilizer, an alarm system or similar. In this way, after positive verification of coded data from an operator, or a data carrier carried by said person with coded data stored in the motor vehicle, the access authorization system can be overridden. For this purpose, the key inserted into a recess of the lock immediately exchanges coded data with the lock in stand-by mode, and after positive evaluation, the corresponding lock in the access authorization system is released. At the same time as the access authorization system is released, the corresponding door locks are unlocked and the immobilizer and the alarm system are deactivated. The operator is then able to open the door and operate the motor vehicle.

Modern access authorization systems for motor vehicles additionally or alternatively enable keyless access to the motor vehicle. Such a type of system is for example, the Passive Access Start and Entry system (PASE) developed by Siemens VDO Automotive. For example, an access authorization request can be initiated by activating a door handle. This is also referred to as a passive access request.

SUMMARY OF THE INVENTION

It is particularly important when using such passive access authorization systems that the alarm system is only deactivated in instances when the access authorization request originates from an authorized operator. In command to avoid unintentional deactivation of an alarm system in these types of systems, very extensive coded data communication is effected between the key and the control device. A distinction is thereby made between data communication for authentication of an authorized key and data communication for deactivation of the alarm system. Whereas only a small amount of data is initially exchanged for authentication of the authorized key, an extraordinarily extensive data protocol is required between the key and the control device for deactivation purposes, which requires considerably more time compared with authentication of the said key. Cryptologically coded data is thereby exchanged between the key and the control device and analyzed. The aim of such cryptology is to ensure that theft or deactivation of an alarm system by an unauthorized user is excluded as far as possible.

To guarantee an increasingly high level of security during the operation of such passive access systems, the scope of the cryptology or the data exchanged between the control device and the key also increases. As a result, the time period for this data communication is longer. The problem then arises that during this time period the doors remain locked, even though a released access request from the motor vehicle user already exists. On initial activation of the door handle, the operator is thus still unable to open the corresponding door and must occasionally activate the door handle two or more times. This is undesirable with respect to user-friendliness.

To avoid this and reduce the response time for passive access, the cryptological data which is exchanged between the key and the control device can be exchanged at very high data transmission speeds with a specified query strategy. This ensures that the doors are unlocked and can therefore be opened directly after an access authorization request. However this is frequently inadequate to reduce the response time, so that the doors are also unlocked within the corresponding response time, thereby avoided repeated activation of the door handle. A further problem arises in that, as transmission speeds increase, the energy consumption required for an access authorization request also increases, which ideally should be avoided.

The same problem occurs in what are referred to as keyless driver authorization systems, whereby a motor vehicle is started by means of keyless data communication between a transponder provided in the key and a corresponding control device in the motor vehicle. Here too, in current systems, a brief authentication is first undertaken, followed by a relatively lengthy second data communication during which cryptological data is exchanged between the transponder and the control device for identification of an authorized vehicle user. In a similar manner to the access authorization systems, the problem also arises here that in the case of a driver authorization request, for example by rotating the key or pressing a button, with which the vehicle user wishes to start the motor, the steering wheel lock in the immobilizer device must first be unlocked. This steering wheel lock is typically coupled to a solenoid by means of which the steering wheel lock is locked. In existing systems, the mechanical unlocking of the steering wheel lock is initiated after release or deactivation of the immobilizer, thus after the second data communication. Since the duration of the mechanical unlocking of the steering wheel lock is typically not negligible, the vehicle user is unable to operate the motor vehicle during this time. This delay should be avoided.

The object of the present invention is to reduce the response time for the mechanical unlocking of a lock device in an anti-theft system.

According to the invention, this object can be achieved by a method for operating an electronic anti-theft system, in particular for motor vehicles, in which the following steps are executed further to a keyless authorization request:
  a) performing a first data communication between an electronic key and a control device of the anti-theft system, during which first coded data for authentication of the key is exchanged;
  b) immediately after the positive evaluation of the first coded data
     (b1) initiating the mechanical unlocking of a locking system of the anti-theft system and (b2) effecting a second data communication between the key and the control device, during which second coded data for deactivation of an alarm system and/or an immobilizer is exchanged;

c) after positive evaluation of the second coded data, deactivating the alarm system and/or the immobilizer.

After positive evaluation of the first coded data, triggering of the alarm system and/or deactivation of the immobilizer can be delayed for a first time period. The first time period may correspond to at least the duration of the second data communication and the evaluation of the second coded data. In the case of the first data communication a first request can be first made by the control device to the key by transmitting first coded signals, whereupon the key sends back a coded identification signal. In the case of the second data communication a second request can be first made by the control device to the key by transmitting second coded signals, whereupon these second coded signals are evaluated in an evaluation unit provided in the key and after positive evaluation third coded signals are sent back to the control device. The first and/or second request can be transmitted via an LF channel. The response signal can be sent further to the first and/or the second request via an RF channel. The anti-theft system may comprise an access authorization system, whereby further to an access authorization request and mechanical unlocking of at least one door lock is first executed after positive evaluation of the first coded data and whereby the alarm system is only deactivated after positive evaluation of the second coded data. The access authorization request can be initiated by activating a door handle. Mechanical unlocking can be carried out solely for the door of the locking system, at which the access authorization request was initiated by activating the door handle. The anti-theft system may comprise a driver authorization system, whereby mechanical unlocking of the ignition lock and/or steering wheel lock is first executed further to a driver authorization request and after positive evaluation of the first coded data and whereby the immobilizer is only deactivated after positive evaluation of the second coded data. Both the first and the second data communication can be effected without a key, using a transponder arranged in the key. Mechanical unlocking of at least one door lock and also the steering wheel lock can be effected further to an authorization request.

The object can also be achieved by an electronic anti-theft system comprising:

a) means for performing a first data communication between an electronic key and a control device of the anti-theft system, during which first coded data for authentication of the key is exchanged;

b) means for, immediately after the positive evaluation of the first coded data,
   (b1) initiating the mechanical unlocking of a locking system of the anti-theft system and
   (b2) effecting a second data communication between the key and the control device, during which second coded data for deactivation of an alarm system and/or an immobilizer is exchanged; and c) means for, after positive evaluation of the second coded data, deactivating the alarm system and/or the immobilizer.

The anti-theft system may comprise at least one locking system, an alarm system, and/or an immobilizer, a control device which controls the locking system as well as the immobilizer and/or the alarm system, and an electronic key, by means of which a data communication can be carried out with the control device. A motor vehicle door locking system, in particular a central locking system, can be provided as the locking system. The electronic key may comprise a transponder, by means of which contactless data communication can be effected between the key and the control device. The immobilizer may comprise a steering wheel locking system, in particular a mechatronic steering wheel lock, whereby mechanical handling of the key takes place and whereby rotation release of the locking system is effected by means of a solenoid.

The basic idea behind the current invention comprises separating the processes for access authorization or driver authorization with regard to the authentication of an authorized key and with regard to deactivation of the alarm system or the immobilizer. The present invention is based on the knowledge that the process for authenticating a key is considerably shorter in comparison with deactivation of the alarm system or immobilizer. The reason for this is that typically very little data is exchanged to unlock the vehicle doors or the ignition lock and/or the steering wheel lock. Disarming of the alarm system or deactivation of the immobilizer on the other hand requires complete cryptology, in other words, extensive coded data, which is used to identify an authorized user, is exchanged here between the key and the control device. What is known as a challenge-response communication method is advantageously used here, whereby a coded request is made from the control device to the key. After evaluation of this request within the key, a coded response is sent from the key to the control device.

Since the mechanical opening process for opening the door locks or the steering wheel locks also requires a significant amount of time, said process can be initiated immediately after authentication of an authorized key. There is therefore no need to wait until the time-consuming data communication between the key and the control device, by means of which the alarm system and the immobilizer are to be deactivated, is completed. This mechanical opening process therefore operates more or less in parallel with the deactivation process and is very frequently completed even before deactivation of the alarm system and/or immobilizer.

The particular advantage is that the motor vehicle doors can now be opened very quickly so that in the case of a keyless passive access authorization system, multiple activation of the door handles to open the doors is not required or occurs a lot less. Access to the motor vehicle is thus configured in a more user-friendly manner. Since the alarm system has not yet been disarmed at this point in time, a high security standard remains guaranteed despite the premature opening of the doors.

Since during this data communication the alarm system is still activated, but the doors can still be opened, a time delay is advantageously provided, during which possibly unintentional activation of the alarm system is prevented. Only if the alarm system has not been disarmed after expiry of this time delay, is the alarm system then activated, whereby unauthorized use of the motor vehicle is indicated.

In a particularly advantageous variant, the triggering of the alarm system is only delayed at the door, at which the access authorization request was detected and a corresponding key was identified. All the other doors without access authorization requests remain wholly functional and secured by the alarm.

The particular advantage in the case of keyless driver authorization systems is that the steering wheel lock can be very quickly unlocked, since only the first data communication (authentication) has to be awaited here. The second data communication, by means of which the immobilizer is deactivated, is effected in parallel with this unlocking process. In contrast to the mechanical unlocking process of the steering wheel lock, deactivation of the immobilizer is effected electronically and can be effected extremely quickly in the event of positive identification of an authorized vehicle user. In this way, the unlocking process by means of the issue of the rotation release is separate from deactivation of the immobilizer by releasing the starter motor.

Authentication of an authorized user takes place in a very short amount of time, so that the unlocking process can follow very quickly. Deactivation of the immobilizer and thus the release of the starter motor in the motor vehicle advantageously takes place only after the exchange of very extensive cryptologically coded data. In this way a large part of the response time is brought forward in time, in other words to a time period that is no longer relevant for the unlocking of the ignition lock mechanism or the steering wheel locking mechanism. As a result, the start process can be effected in a more user-friendly, less jerky and in particular more rapid manner.

In one very advantageous embodiment, the mechanical unlocking of both at least one door lock and also the steering wheel lock is effected further to an authorization request, for example access authorization. Thus after opening the doors, it is possible to start the engine in a more user-friendly manner, since the mechanical opening process of the solenoid at the steering wheel lock is executed before the driver authorization request.

The method according to the invention also enables a reduction in cost with respect to anti-theft systems according to the invention, since what are referred to as 'servo latches' can advantageously be dispensed with here.

Advantageous embodiments and developments of the invention will emerge from the description with reference to the drawing.

BRIEF DESCRIPTION OF THE DRAWINGS

The invention is described in more detail below with reference to the exemplary embodiments specified in the schematic figures of the drawing, in which:

FIG. 1 shows a block diagram of an anti-theft system according to the invention

FIG. 2 shows a schematic time-based diagram to illustrate the method according to the invention for operating the anti-theft system In the figures of the drawing, identical elements or elements and signals with the same function have been labeled with the same reference numbers.

DETAILED DESCRIPTION OF EMBODIMENTS

FIG. 1 shows in a general form a block diagram for an electronic anti-theft system in a motor vehicle, which comprises a control device in the motor vehicle (not shown). The control device 1 uses lines 2, which can be operated bidirectionally, for a connection to communicate with the vehicle door locking system 3, especially a central locking system, the vehicle ignition lock and/or steering wheel lock 4, an alarm system 5, and/or an immobilizer 7. The door locking system 3 and/or the ignition locking system 4 can be activated by an electronic key 6 carried by an operator of the motor vehicle, which can for example be inserted mechanically into one of the locks 3, 4, for activation. In addition, electronic activation of the lock, for example by remote control, is conceivable for opening the doors. The key 6 can be configured in a conventional way, i.e. using the known key-lock principle, or also as a cheque card or chip card.

In addition or alternatively, the access authorization system comprises what is referred to as a PASE system, which enables key-less access and starting of the motor vehicle. For this purpose, the electronic key 6 comprises a transponder 8, which can communicate with a transceiver (not shown) arranged in the motor vehicle. The structure and functionality of this type of electronic key 6 configured for transponder technology is generally known, thus a closer examination thereof is not required.

The control device 1 can be configured by a control device for an immobilizer, a control device for a driver authorization system, or a control device for an alarm system and can comprise all functions for opening and locking motor vehicle doors, motor vehicle functions, alarm functions of the steering wheel lock and the immobilizer. The control device 1 checks whether the key 6 used is authorized or not and unlocks the corresponding doors or locks, if the key 6 is authorized. Furthermore if the key 6 is authorized and the corresponding cryptological data is available, the alarm unit or the immobilizer is deactivated.

On the basis of a schematic time-based diagram, FIG. 2 shows the inventive process of data communication between the key and the control device in an anti-theft system according to the invention.

It should first be assumed that the anti-theft system is what is termed a PASE access authorization system. In addition to an alarm system, this PASE system comprises a key for the passive access authorization request as well as a corresponding control device for processing this passive access authorization request. In the case of a passive access authorization request, the key is not inserted into the lock in its usual manner, but data communication takes place between the key and the lock or the control device assigned to this lock, further to an access authorization request from the motor vehicle user.

During this data communication, the key and control device exchange coded data, whereby said coded data is used to check whether or not the motor vehicle user is authorized.

According to the time-based flow diagram in FIG. 2, the motor vehicle user activates a door handle 21 (time interval 10) at time t=t0. This activation of the door handle 21 is interpreted by the anti-theft system as an access authorization request. The control device is first activated (time interval 11) as a result of this access authorization request. Said control device is typically in a low energy mode, for example, power down mode or sleep mode, in command to avoid consuming unnecessary energy during such time intervals when no access authorization requests have to be processed. The control device can be very quickly reactivated by means of what is termed a 'wake-Up' signal. This wake-up-signal is for example a signal derived from the access authorization request.

A short first data communication (time interval 12, time interval 13) is then effected between the control device and the key. During this first data communication (time interval 12, time interval 13) a short request is first sent from the control device to the key (time interval 12), whereupon the key responds immediately (time interval 13). During this first data communication (time interval 12, time interval 13) a request is made for example as to whether the respective key also belongs to the present motor vehicle, for example by outputting and checking the motor vehicle number or the key number. If, further to this request, a response is effected with or even without special data content, the control device assumes that a valid key is present. This data communication is comparable with registration or authentication in the case of current PASE systems. Immediately after this data communication (time interval 12, time interval 13) the control device outputs a command (time interval 14), by means of which the corresponding door lock or all door locks of the locking system are opened. At time t1, the section for the first data communication is completed.

The corresponding lock or all locks in the central locking system are opened (time interval 15) immediately after the unlocking command (time interval 14). Subsequent to this mechanical unlocking process (time interval 15), in other words at time t2>t1, the motor vehicle user is able to open the corresponding door, by means of which the access authorization request (time interval 10) is effected, or depending on the design is also able to open all the other doors.

It is however essential that after the first data communication (time interval 12, time interval 13) or after unlocking (time interval 14), the alarm system in the motor vehicle still remains on alert for the time period t>t1. The motor vehicle user can only open the corresponding door. Despite an activated alarm system, such an opening operation does not however immediately trigger the alarm. According to the invention, the opening of the doors does not trigger the alarm system until after a corresponding time delay, unless said alarm system has been deactivated in the meantime. This time delay is measured in such a way that a subsequent second data communication, during which it is verified whether the alarm system should be deactivated, is completed within this time delay . The second data communication is terminated in the example in FIG. 2 at time t3>t2. Time t4, at which the alarm system is triggered (time interval 20) and thus the delay should be set, so that t4>t3.

The second data communication (time interval 16, time interval 17, time interval 18) takes place between the control device and the key immediately following the first data communication (time interval 12, time interval 13) between the control device and key or in some instances also only after the unlocking command has been output (time interval 14) (t t1).

In contrast to the first data communication (time interval 12, time interval 13), during this second data communication (time interval 16, time interval 17, time interval 18) cryptologically coded data is exchanged between the control device and the key. This data communication (time interval 16, time interval 17, time interval 18) between the control device and the key lasts considerably longer in comparison with the first data communication (time interval 12, time interval 13), during which no or very little cryptologically coded data is exchanged.

A request (time interval 16) is first made from the control device to the key, for example via the LF (low frequency) channel. This request is processed and evaluated in an integrated circuit in the key (time interval 17). The key generates a response signal based on this, which comprises cryptologically coded data and sends this data signal back to the control device (time interval 18) via the RF (radio frequency) channel. If the evaluation of both the request (time interval 16) and also the response (time interval 18) indicates that the access authorization request has been effected in a correct manner and the motor vehicle user is also authorized, then the control device generates a control signal (time interval 19) by means of which the alarm system is disarmed and any immobilizer is deactivated.

On the contrary, if the data communication (time interval 16, time interval 17, time interval 18) concludes that the motor vehicle user is unauthorized, then the vehicle door is open but the alarm system remains activated as beforehand. This means however, that after the expiry of delay , which as stated above is necessary to open the doors, the alarm system becomes active and outputs corresponding acoustic and/or optical signals, which indicate that an unauthorized motor vehicle user is present in the motor vehicle. Additionally or alternatively further signals can be immediately transmitted by means of radio communication to a central location, which are forwarded to a police department.

The content and the time period which is necessary for the data communications at time intervals 12, 13, 16, 19 are described below with reference to an example:

1. LF-request (time interval 12):
   4 bytes in total, comprising 1 byte run-in (preparation of the respective recipient), 1 byte code violation (=conscious code violation for preparing the wake-up), 2 bytes WUP (wake-up), thus with a data transmission speed of 4 kBD, 8 msec of time is required.

2. RF-response (time interval 13):
   1.5 bytes in total, comprising 1 byte run-in, 0.5 bytes for the code of the key number, thus with a data transmission speed of 8 kBd, 1.5 msec of time is required.

3. LF-Request (time interval 16):
   16 bytes in total, comprising 1 byte run-in, 1 byte code violation, 4 bytes WUP, 10 bytes for the transmission of coded data, thus with a data transmission speed of 4 kBd, 32 msec of time is required.

4. RF-response (time interval 18):
   11 bytes in total, comprising 1 byte run-in, 10 bytes for the transmission of coded data, thus with a data transmission speed of 8 kBd, 11 msec of time is required.

5. Mechanical unlocking time (time interval 15):
   Time period required for mechanical unlocking of the doors is approximately 50 msec.

According to the numerical examples above, the first data communication (time interval 12, time interval 13), during which no or very little cryptological data is exchanged, merely lasts 9.5 msec. In contrast, the second data communication (time interval 16, time interval 17, time interval 18), during which cryptological data is exchanged according to a challenge response communication, lasts at least 43 msec, and is thus clearly longer than the first data communication (time interval 12, time interval 13). Since a significant time period (approx 50 msec) is required for the mechanical unlocking (time interval 15) of the door, the opening of the door can be initiated advantageously immediately after the first data communication (time interval 12, time interval 13) and the second data communication (time interval 16, time interval 18) can take place in parallel with this mechanical unlocking (time interval 15). In this way, the response time for passive access and mechanical unlocking is significantly reduced without significantly restricting the anti-theft protection.

It was assumed in the preceding description of FIG. 2, that the anti-theft system is what is known as a PASE access authorization system. The method according to the invention can however also be very advantageously applied to what is known as a PASE driver authorization system. A brief description of the method according to the invention in the case of a PASE driver authorization system is therefore also shown briefly in FIG. 2.

At time t=t0, the motor vehicle user presses a handle on the ignition lock or on the steering wheel lock, for example by handling the electronic key (time interval 10). This is interpreted by the anti-theft system as a driver authorization request. As a consequence of this driver authorization request, the control device (time interval 11) is activated. Subsequently a brief data communication (time interval 12, time interval 13) takes places between the control device and the electronic key, during which a short request from the control device is transmitted to the key (time interval 12), whereupon the key (time interval 13) responds immediately. In the event of positive authentication or registration, immediately after this data communication (time interval 12, time interval 13) the control device outputs a rotation release command (time interval 14), which is forwarded to a mechatronic steering wheel lock (MLV). The steering wheel lock of a steering wheel locking system can be opened further to this rotation release command (time interval 14). At time t1, the section for the first data communication is therefore completed.

The first data communication is effected, in particular with regard to the exchange of the request and response data between the control device and the key, in a similar manner to the method described above for access authorization.

The steering wheel lock (time interval 15) is advantageously opened immediately after (t>t1) the rotation release command.

After the first data communication (time interval 12, time interval 13), the immobilizer is still activated for time t>t1. Starting the engine in the motor vehicle is thus not yet possible, since due to the activated immobilizer the engine control device will not yet initiate the starting of the engine despite authenticated access authorization.

A second data communication (time interval 16, time interval 17 time interval 18) takes place between the control device and key immediately after the first data communication (time interval 12, time interval 13). During this second data communication (time interval 16, time interval 17, time interval 18) a request (time interval 16) is first made from the control device to the key, which is processed and evaluated in the key (time interval 17). The key generates a response signal based on this, which comprises cryptologically coded data, and sends this data signal back to the control device (time interval 18). If the evaluation of the request (time interval 16) in the control device and the response (time interval 18) indicates that the driver authorization request is correct, then the immobilizer is deactivated by means of a control signal (time interval 19). Subsequently the engine of the motor vehicle is started by means of a further control signal from the engine control device.

The second data communication is effected here in an equivalent manner to the second data communication of the access authorization method.

Although the present invention has been described above with reference to preferred exemplary embodiments, it is not limited to these but can be modified in many different ways.

Thus the invention is not necessarily limited to the use of an anti-theft system, which is configured as an access authorization system or a driver authorization system. Rather the invention can be expanded to comprise any anti-theft systems, in which an authorization request is processed in the manner set out above. Furthermore, the invention is also not limited to anti-theft systems in motor vehicles but can of course also be used for other applications, for example in keyless access authorization systems for opening house doors or garage doors.

Furthermore the method is not limited to a data communication between a control device and an electronic key, whereby the data communication is effected using transponder technology. Rather wired data communication can also be effected between the key and the control device. Thus in this context, "keyless" means that the conventional, mechanical use of a key which does not comprise a corresponding key bit, is not applied.

In the present case, an anti-theft system comprises an access authorization system and/or a driver authorization system, however the anti-theft system can also additionally or alternatively include further components. In the present case, an authorization request refers to an access authorization request, a driver authorization request or suchlike.

We claim:

1. A method for operating an electronic anti-theft system, in particular for motor vehicles, in which the following steps are executed further to a keyless authorization request:
   a) performing a first data communication between an electronic key and a control device of the anti-theft system, during which first coded data for authentication of the key is exchanged;
   b) immediately after the positive evaluation of the first coded data
      (b1) initiating the mechanical unlocking of a locking system of the anti-theft system;
      (b2) effecting a second data communication between the key and the control device, during which second coded data for deactivation of an alarm system is exchanged;
      (b2) delaying the triggering of the alarm system for a first time period;
   c) after positive evaluation of the second coded data, deactivating the alarm system; and
   wherein the anti-theft system comprises an access authorization system, whereby further to an access authorization request and mechanical unlocking of at least one door lock is first executed after positive evaluation of the first coded data and whereby the alarm system is only deactivated after positive evaluation of the second coded data.

2. The method according to claim 1, wherein the first time period corresponds to at least the duration of the second data communication and the evaluation of the second coded data.

3. The method according to claim 1, wherein in the case of the first data communication a first request is first made by the control device to the key by transmitting first coded signals, whereupon the key sends back a coded identification signal.

4. The method according to claim 1, wherein in the case of the second data communication a second request is first made by the control device to the key by transmitting second coded signals, whereupon these second coded signals are evaluated in an evaluation unit provided in the key and after positive evaluation third coded signals are sent back to the control device.

5. The method according to claim 3, wherein the first and/or second request is transmitted via an LF channel.

6. The method according to claim 4, wherein the first and/or second request is transmitted via an LF channel.

7. The method according to claim 3, wherein the response signal is sent further to the first and/or the second request via an RF channel.

8. The method according to claim 1, wherein the access authorization request is initiated by activating a door handle.

9. The method according to claim 8, wherein mechanical unlocking is carried out solely for the door of the locking system, at which the access authorization request was initiated by activating the door handle.

10. The method according to claim 1, wherein the anti-theft system comprises a driver authorization system, whereby mechanical unlocking of the ignition lock and/or steering wheel lock is first executed further to a driver authorization request and after positive evaluation of the first coded data and whereby the immobilizer is only deactivated after positive evaluation of the second coded data.

11. The method according to claim 1, wherein both the first and the second data communication are effected without a key, using a transponder arranged in the key.

12. The method according to claim 1, wherein mechanical unlocking of at least one door lock and also the steering wheel lock is effected further to an authorization request.

13. An electronic anti-theft system comprising:
   a) means for performing a first data communication between an electronic key and a control device of the anti-theft system, during which first coded data for authentication of the key is exchanged;
   (b) means for, immediately after the positive evaluation of the first coded data,
      (b1) initiating the mechanical unlocking of a locking system of the anti-theft system;
      (b2) effecting a second data communication between the key and the control device, during which second coded data for deactivation of an alarm system is exchanged; and
      (b3) delaying the triggering of the alarm system for a first time period;
   c) means for, after positive evaluation of the second coded data, deactivating the alarm system; and wherein the anti-theft system comprises an access authorization system, whereby further to an access authorization request and mechanical unlocking of at least one door lock is first executed after positive evaluation of the first coded data and whereby the alarm system is only deactivated after positive evaluation of the second coded data.

14. The anti-theft system according to claim 13, comprising:
   at least one locking system,
   an alarm system, and/or an immobilizer,
   a control device which controls the locking system as well as the immobilizer and/or the alarm system, and
   an electronic key, by means of which a data communication can be carried out with the control device.

15. The anti-theft system according to claim 13, wherein a motor vehicle door locking system, in particular a central locking system, is provided as the locking system.

16. The anti-theft system according to claim 13, wherein the electronic key comprises a transponder, by means of which contactless data communication can be effected between the key and the control device.

* * * * *